Oct. 1, 1929. G. STANCU, JR 1,730,305
UNIVERSAL PLUG VALVE
Filed Feb. 3, 1927  2 Sheets-Sheet 1

INVENTOR
George Stancu Jr.,
BY
ATTORNEYS

Oct. 1, 1929.  G. STANCU, JR  1,730,305
UNIVERSAL PLUG VALVE
Filed Feb. 3, 1927  2 Sheets-Sheet 2
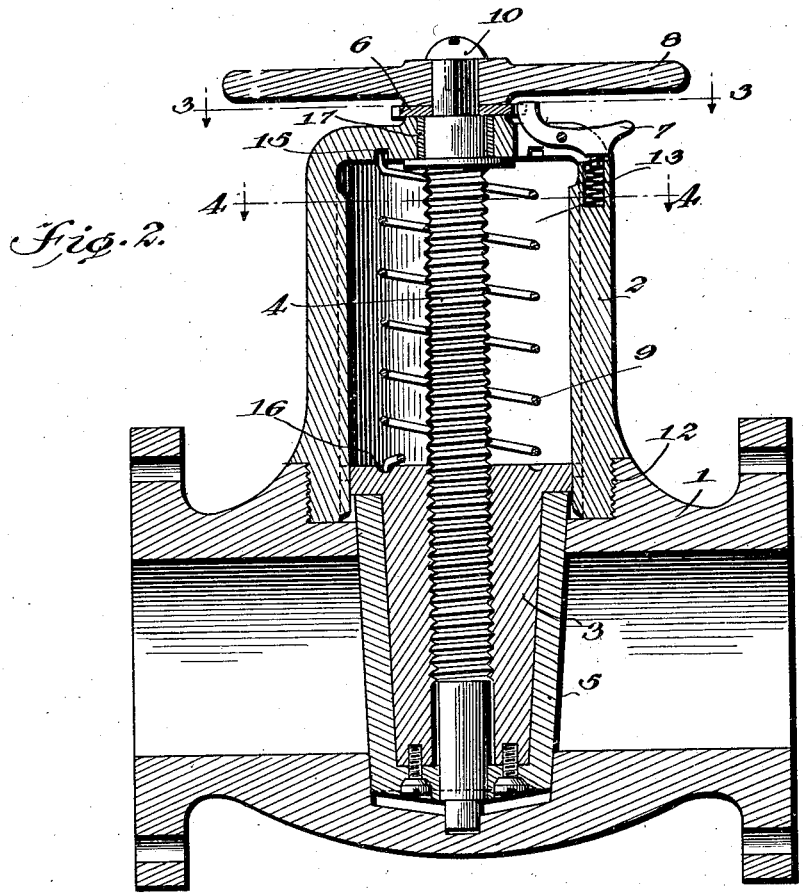
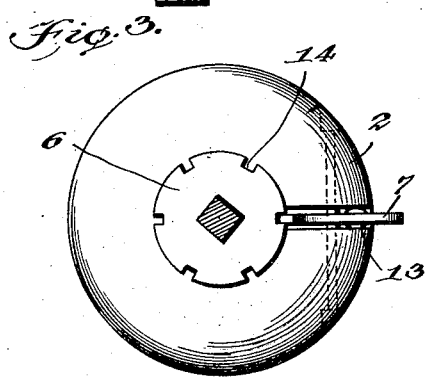
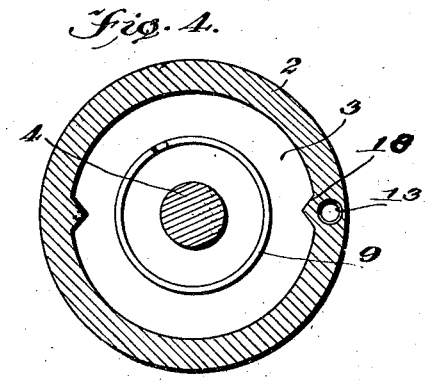
INVENTOR
George Stancu Jr., Patented Oct. 1, 1929

1,730,305

UNITED STATES PATENT OFFICE

GEORGE STANCU, JR., OF PHILADELPHIA, PENNSYLVANIA

UNIVERSAL PLUG VALVE

Application filed February 3, 1927. Serial No. 165,664.

This invention relates in general to valves, more particularly to valves of the universal plug type, so called "universal" because it can be manufactured to replace any type valve.

The object of the invention is to provide a valve which will prevent leakage or escape of fluid, and which is resistant to pressure, gas, liquid, etc., and which when once installed does not require repairs, no packing being necessary.

The valve possesses the further advantage in that no extra space is necessary in operating it, and can not be accidently displaced from any one of its several selective or predetermined positions of operation when set by the operator. The valve automatically locks in any selected position of operation, when the operator turns the valve at any predetermined point desired after having released the locking means from a previously engaged position.

Referring to the drawings:—

Figure 2 is a vertical section taken through the central portion of the valve,

Figure 3 shows a view of the washer on section line 3—3 of Fig. 2,

Figure 4 represents a section through the casing of the valve taken on line 4—4 of Fig. 2, looking in the direction of the arrows.

Figure 1:
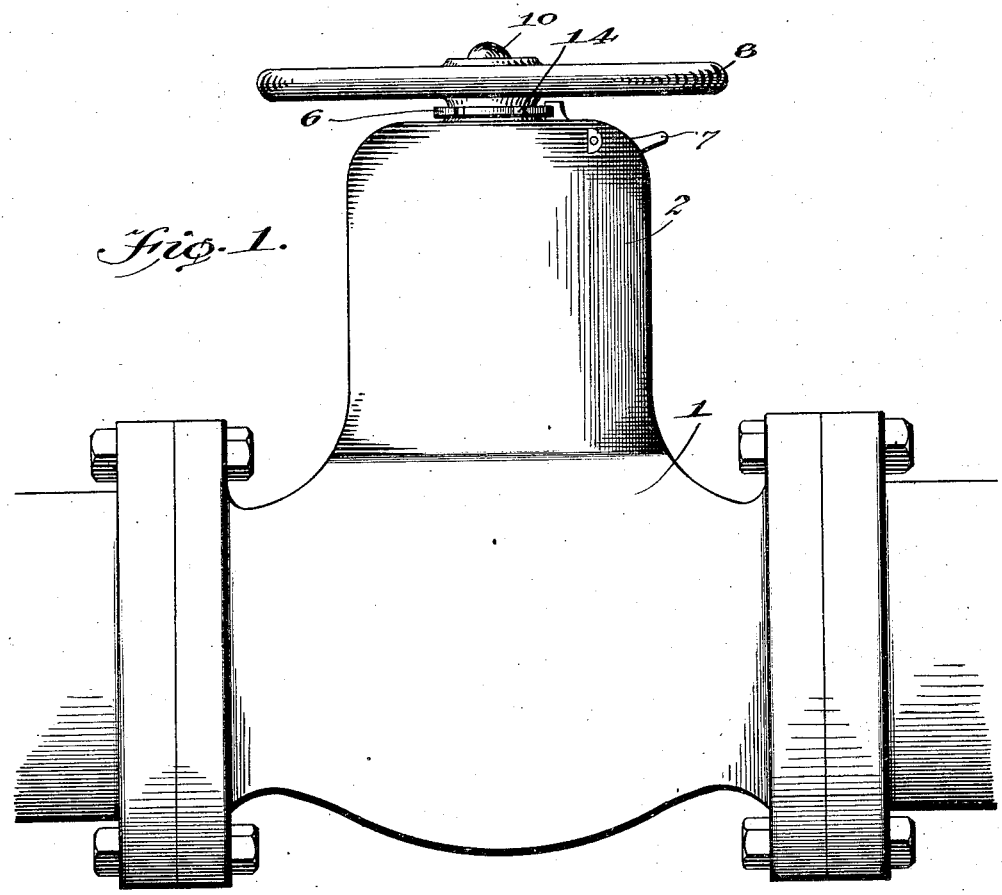
Figure 1 represents a perspective view of the valve as installed.
Figure 5:
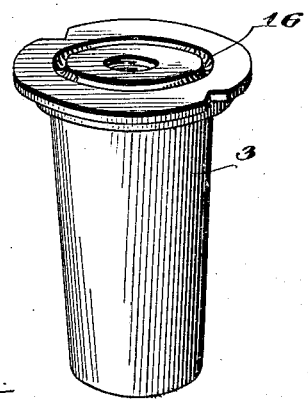
Figure 5 is a view showing the plug which is operated by the screw 4.

Referring to the drawings the numeral 1 represents the body of the valve into which body the valve casing 2 is inserted as by screwing along screw threads 12. In the valve casing 2 is inserted a plug 3 of brass which is apertured along its longest diameter to receive the stationary screw 4 which operates the plug, this being made of brass and being provided with U. S. standard threads. Before assembling the valve, a plug cap 5 of hard rubber or soft brass is secured by any proper means to the brass plug 3, this plug cap being tapered to closely fit the recess provided for the same in casing 1.

The screw 4 is secured at its upper end to wheel 8, which operates the valve. The wheel 8 is secured to the stem 4 by means of screw 10 which fits through a square hole in wheel 8.

Between the wheel 8 and the casing 2, there is inserted a washer 6 provide with a plurality of notches 14 (as illustrated, six in number) spaced apart at selected or predetermined intervals into which notches pressing lever 7 is adapted to be fitted, this lever 7 being actuated under spring pressure from spring 13, this means constitutes a provision for locking the valve in any desired position, and as shown six positions are available in each turn of the wheel 8. When the detent or lever 7 is released from engagement with one notch of the washer 6, the spring 16 will act to hold the detent in contact with the peripheral edge of the washer, during further turning movement of the valve and until another notch is reached, at which point, the detent will be automatically snapped into engagement with the latter to hold the valve against any accidental movement from this position of operation.

The valve casing 2 is notched as shown at 15 and in these notches is placed a spring 9, the other end of the spring being secured in notches 16 of the plug 3. This spring 9 is preferably formed of about one-sixteenth of an inch diameter with one thread per inch, and serves to help maintain the plug 3 in fixed position as the screw 4 rotates within the plug 3. Member 17, Fig. 2, shows a bushing of brass or other desirable material which is pressed in the top of the casing and which acts as a bearing for the stationary screw 4. However, should the operator wish to rotate the valve to a greater extent than the distance between adjacent notches, he or she must hold the detent 7 against the tension of the spring 13 and until the valve has reached a selected position of operation, when, by freeing the detent for contact with the peripheral edge of the washer 6, the spring 16 will act to force the detent into engagement with the selected notch. Thus, the valve will be securely locked in any one of its several predetermined positions of operation, and against accidental displacement from a selected position of operation.

The operation of the valve is thought to be obvious from an inspection of the drawings, the rotation of the wheel 8 causing the plug 3 and plug cap 5 to rise along the threads of the screw 4 thereby opening the valve. When the valve is closed by virtue of its construction, there will be no leakage and because of its construction it will be highly resistant to fluid pressure. The construction assures a tight fit between the parts 5 and 1, and by virtue of the construction illustrated it will be seen that no packing is necessary and that when the valve has been installed no repairs will be required.

I claim:—

1. A two-way valve comprising a body having an opening in its upper side, a depression formed in the inner wall of the lower side of said body in line with the said opening, a valve plug movable vertically of said body through the said opening, a pressure and liquid-tight cap engaged over the lower end of said valve plug and encircling the sides of the same, the lower end of said cap being adapted to seat in said depression when moved with the plug to closed position, an annular depression formed in the upper outer side of said body and surrounding the said opening, a hollow dome rising from said annular depression and forming a guide for said valve plug in its opening and closing movements, a stem journaled at its lower end in the lower wall of said body and at its upper end in the top wall of said dome, said valve plug having an axial bore extending vertically therethrough and in screw threaded engagement with said stem, a compression spring surrounding said stem within said dome and bearing against the upper side of said valve plug, an operating member secured to the upper end of said valve stem exteriorly of said dome, and means for adjustably latching said valve stem to sustain said valve plug in any desired position of operation.

2. A two-way valve comprising a body having an opening in its upper side, a depression formed in the inner wall of the lower side of said body in line with said opening, a downwardly tapered valve plug movable vertically of said body through the said opening, a pressure and liquid-tight cap engaged over the lower end of said valve plug and encircling the sides of the same, the lower end of said cap being adapted to seat in said depression when moved with the plug to closed position, an annular flange formed at the upper end of said valve plug and overlying the upper edge of said cap, said flange being of a greater diameter than the side opening in said body, a hollow cylindrical dome rising from said annular depression, guide members at the opposite sides of the interior of said dome, said dome having its interior of a diameter to allow sliding engagement therein of said flange, notches formed diametrically of said flange and engaged with said guide members, a stem journaled at its lower end in the lower wall of said body and at its upper end in the top wall of said dome, said valve plug having an axial bore extending vertically therethrough and in screw threaded engagement with said stem, a compression spring surrounding said stem within said dome and bearing against the upper side of said valve plug, an operating member secured on the upper end of said valve stem exteriorly of said dome, and cooperative means carried by said dome and said valve stem for adjustably latching said valve stem to sustain said valve plug in any desired position of operation.

GEORGE STANCU, Jr.